(12) United States Patent
Holzmann

(10) Patent No.: US 7,957,522 B2
(45) Date of Patent: Jun. 7, 2011

(54) PROGRAMMABLE PLAIN OLD TELEPHONE LINE IMPEDANCE MATCHING CIRCUITS

(75) Inventor: Peter J. Holzmann, San Jose, CA (US)

(73) Assignee: Winbond Electronics Corporation, Hsinchu (TW)

( * ) Notice: Subject to any disclaimer, the term of this patent is extended or adjusted under 35 U.S.C. 154(b) by 1240 days.

(21) Appl. No.: 11/599,681

(22) Filed: Nov. 14, 2006

(65) Prior Publication Data

US 2007/0206775 A1    Sep. 6, 2007

Related U.S. Application Data

(60) Provisional application No. 60/779,622, filed on Mar. 6, 2006.

(51) Int. Cl.
H04M 1/00 (2006.01)
(52) U.S. Cl. ........................................ 379/394; 379/398
(58) Field of Classification Search .................. 379/394, 379/398

See application file for complete search history.

(56) References Cited

U.S. PATENT DOCUMENTS

| | | | |
|---|---|---|---|
| 4,558,185 A | 12/1985 | Morikawa et al. | |
| 4,631,359 A | 12/1986 | Johansson et al. | |
| 4,789,999 A | 12/1988 | Meschkat et al. | |
| 5,187,742 A | 2/1993 | Moran, III et al. | |
| 5,402,485 A | 3/1995 | Takato et al. | |
| 5,473,685 A | 12/1995 | Mulder | |
| 5,598,467 A | 1/1997 | Bremner et al. | |
| 6,625,278 B1 | 9/2003 | Hendricks et al. | |
| 6,735,302 B1 | 5/2004 | Caine et al. | |
| 6,920,471 B2 | 7/2005 | Chan et al. | |
| 6,925,171 B2 | 8/2005 | Wang et al. | |
| 6,990,191 B2 | 1/2006 | Anderson et al. | |
| 7,062,037 B2 | 6/2006 | Chan et al. | |
| 2003/0076945 A1 | 4/2003 | Huang et al. | |
| 2003/0169871 A1* | 9/2003 | Enriquez et al. | 379/387.01 |

OTHER PUBLICATIONS

Rinaldo Castello et al., "A BiCMOS Speech Circuit with Only Two External Components", IEEE Journal of Solid-State Circuits, Jul. 1993, vol. 28, No. 7, pp. 770-777.

* cited by examiner

*Primary Examiner* — Simon Sing
*Assistant Examiner* — Simon King
(74) *Attorney, Agent, or Firm* — Blakely Sokoloff Taylor & Zafman LLP

(57) ABSTRACT

Programmable plain old telephone line impedance matching circuits that provide an accurate, integrated programmable termination and source impedance for a telephone line interface circuit (SLIC). The accurate matching of this programmable termination and source impedance with the termination impedance of the 2 Wire connection eliminates signal reflections on this connection and therefore removes the echo, which echo can lead to reduced signal quality in packetized VOIP systems. The programmable integrated impedance matching circuits of this invention use a programmable time continuous amplifier preferably in combination with a double sampling programmable switched capacitor feedback stage (sampling twice per clock cycle by sampling on the positive and negative phases of a non-overlapping clock cycle). Use of a switched capacitor circuit to synthesize a resistance allows the realization of the relatively long time constants needed, generally, thereby allowing the realization of the present invention programmable impedance matching circuit as an integrated circuit without external discrete resistors or capacitors.

18 Claims, 17 Drawing Sheets

PROGRAMMABLE PLAIN OLD TELEPHONE LINE IMPEDANCE MATCHING CIRCUITS

CROSS-REFERENCE TO RELATED APPLICATION

This application claims the benefit of U.S. Provisional Patent Application No. 60/779,622 filed Mar. 6, 2006.

BACKGROUND OF THE INVENTION

1. Field of the Invention

Telephone circuits and VOIP (voice over Internet protocol) ATAs (analog terminal adapters) as applied in analog telephone line circuits that interface through a 2 wire connection with a characteristic termination impedance within the voice band (200 Hz, 3400 Hz).

2. Prior Art

Throughout the global telephony administrations, three types of characteristic telephone line impedances ZL can be found. These are shown in the three cases of FIG. 1.

Examples of actual values applicable to FIG. 1 are shown in Table 1.

TABLE 1

|   |   | R1 (Ohm) | R2 (Ohm) | C1 (Farad) |
|---|---|---|---|---|
| 1 | US PBX, Korea, Taiwan | 600 | 0 | 0 |
| 2 | Brazil | 900 | 0 | 0 |
| 3 | Japan CO | 600 | 0 | 1.00E-06 |
| 4 | Bellcore | 900 | 0 | 2.16E-06 |
| 5 | CTR21 | 270 | 750 | 1.50E-07 |
| 6 | China CO | 200 | 680 | 1.00E-07 |
| 7 | China PBX | 200 | 560 | 1.00E-07 |
| 8 | Japan PBX | 100 | 1000 | 1.00E-07 |
| 9 | India, New Zealand | 370 | 620 | 3.10E-07 |
| 10 | Germany | 220 | 820 | 1.15E-07 |
| 11 | UK | 320 | 1050 | 2.30E-07 |
| 12 | Australia | 220 | 820 | 1.20E-07 |

In addition, the impedance at 12 kHz or 16 kHz is defined at certain administrations when Teletax (metering pulse) is in use. Generally, a fixed resistance of 200 Ohm is used in that case.

The impedance matching is measured by means of the 2 Wire Return Loss RL2W, which is a measure of the amount of reflection R on the telephone line. It can be calculated by:

$$RL_{2W} = -20 \cdot \log^{10}(R) = -20 \cdot \log^{10}\left|\frac{Z_L - Z_S}{Z_L + Z_S}\right|$$

where $Z_L$ is the telephone line impedance and $Z_S$ is the source impedance.

In the ideal case, the return loss is infinite, but when ZL and ZS are not exactly matched, reflection will occur and the return loss can be calculated. The return loss can be measured directly on a 2 Wire connection.

Another way to look at the return loss is through the trans hybrid return loss TBRL. This also includes the Hybrid Balance Gain $A_{HB}$.

$$TBRL = -20 \cdot \log^{10}\left|\frac{(2 - 2 \cdot A_{HB}) \cdot Z_L - 2 \cdot A_{HB} \cdot Z_S}{Z_L + Z_S}\right|$$

$$TBRL\big|_{A_{HB}=0.5} = -20 \cdot \log^{10}\left|\frac{Z_L - Z_S}{Z_L + Z_S}\right|$$

$A_{HB}$ = HybridBalanceGain

At the ideal hybrid balance, the equation resolves into the same equation as the 2 Wire return Loss. The trans hybrid return loss can be measured at the switching side of the network.

Impedance matching circuits in POTS (plain old telephone system) telephone line circuits have been used since full duplex 2 wire connections were in place. The early solutions used expensive and bulky transformers with multi-taps. Later, more advanced solid-state solutions using amplifiers and external discretes were used. Examples of this arrangement can be found in U.S. Pat. Nos. 4,789,999, 4,631,359 and 5,402,485. These solutions were non-programmable and required replacement of matching components at the application level.

FIG. 2 illustrates the typical arrangement of a prior art solid-state impedance matching circuit, such as shown in U.S. Pat. No. 4,789,999. The impedance matching circuit in combination with the feedback loop synthesizes a termination impedance as well as a source impedance $Z_S$, which matches the characteristic telephone line impedance $Z_L$. The telephone line is terminated by a telephone or other telecom product having the same characteristic termination impedance and a voltage source to transmit voice data to the Tx ADC path. The equivalent circuit block diagram then looks like FIG. 3.

Existing solutions of an integrated programmable termination and source impedance for a telephone line interface circuit (SLIC) are described in U.S. Pat. Nos. 6,925,171 and 6,735,302. In these inventions, the impedance matching circuit is implemented by a continuous time path in parallel with a complex digital filter. These digital filters require a DAC, an ADC, anti-aliasing and smoothing filters to operate. This will cause a time delay of the in-band signals. The delay will have a limitation on the maximum possible return loss or trans hybrid return loss. This can be explained by taking two cosine wave signals and subtracting them, which is generally done inside the hybrid balancing circuit shown in FIGS. 2 and 3. Considering the impedance matching circuit to be ideal, apart from having a delay τD due to the ADC/DAC conversion and filtering, the voltages V1 and V2 can be described as:

$$V1 = A \cdot \cos\left(\omega \cdot \left(t + \frac{\tau D}{2}\right)\right)$$

$$V2 = A \cdot \cos\left(\omega \cdot \left(t - \frac{\tau D}{2}\right)\right)$$

Using $\cos\alpha \cdot \cos\beta = \frac{1}{2} \cdot \cos(\alpha - \beta) + \frac{1}{2} \cdot \cos(\alpha + \beta)$ $V1 - V2 = 2 \cdot A \cdot \sin(\omega \cdot t) \cdot \sin(\omega \cdot \tau D)$ The maximum achievable trans hybrid return loss for this example would be:

$V1 - V2 = 20 \cdot \text{Log}^{10}(2 \cdot \sin(\omega \cdot \tau_D))$ $\omega = 2 \cdot \pi \cdot \text{frequency}$ Examples of this are illustrated in FIG. 4. As shown, the delay limits the return loss at higher frequencies, which is also shown in U.S. Pat. No. 6,925,171. A compensation filter can be added to compensate for this delay. This is shown in U.S. Pat. No. 6,920,471.

Another approach of solid state impedance matching is shown in U.S. Pat. No. 4,558,185. In this approach, a switched capacitor network is used for the impedance matching filter. This filter requires an anti-aliasing filter and smoothing filter in order to suppress clock noise on the telephone line. Also, there is no continuous time feedback path available. Therefore, this approach also has limited performance due to group delay.

DETAILED DESCRIPTION OF THE PREFERRED EMBODIMENTS

The present invention provides an accurate, integrated programmable termination and source impedance for a telephone line interface circuit (SLIC). The accurate matching of this programmable termination and source impedance with the termination impedance of the 2 Wire connection elimi-nates signal reflections on this connection and therefore removes the echo, which can lead to reduced signal quality in packetized VOIP systems.

Figure 5:
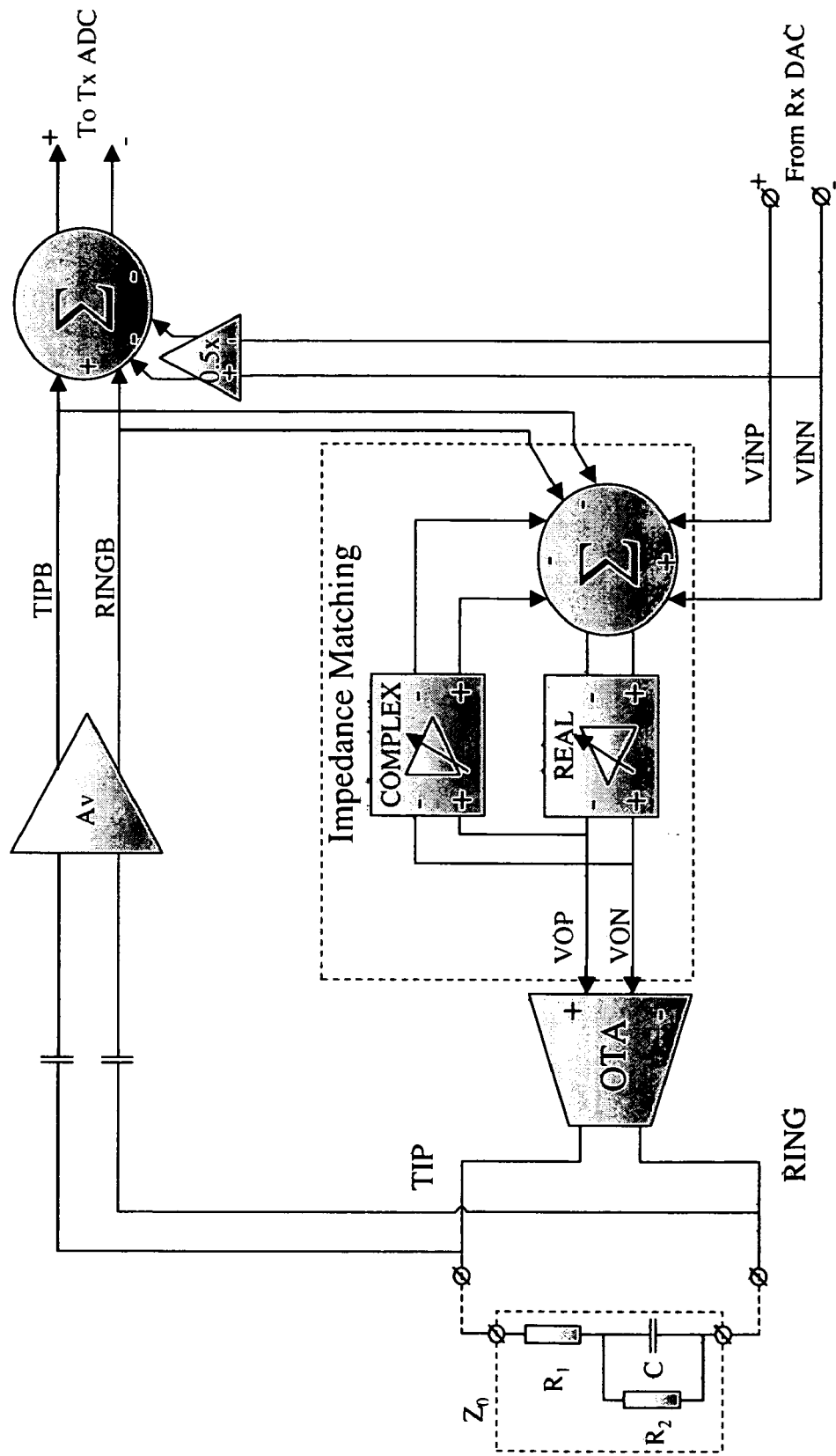
FIG. 5 illustrates the typical arrangement of the programmable integrated impedance matching circuits of the present invention.

The programmable integrated impedance matching circuits of this invention use a programmable time continuous amplifier in combination with a double sampling programmable switched capacitor feedback stage (sampling twice per clock cycle by sampling on the positive and negative phases of a non-overlapping clock cycle). The double sampling switched capacitor feedback stage is a sampling circuit and therefore will contribute delay. However, the delay is minimized due to the double sampling and the direct feedback to the continuous time amplifier stage. This arrangement does not require a delay compensation network. Use of a switched capacitor circuit to synthesize a resistance allows the realization of the relatively long time constants needed, generally, thereby allowing the realization of the present invention programmable impedance matching circuit as an integrated circuit without external discrete resistors or capacitors. In addition, the implemented time constants will be synthesized by ratios of integrated capacitors using the switched capacitor stages. This will strongly reduce the process sensitivity during manufacturing as compared to general RC stages. A block diagram of the circuit is shown in FIG. 5.

Figure 6:
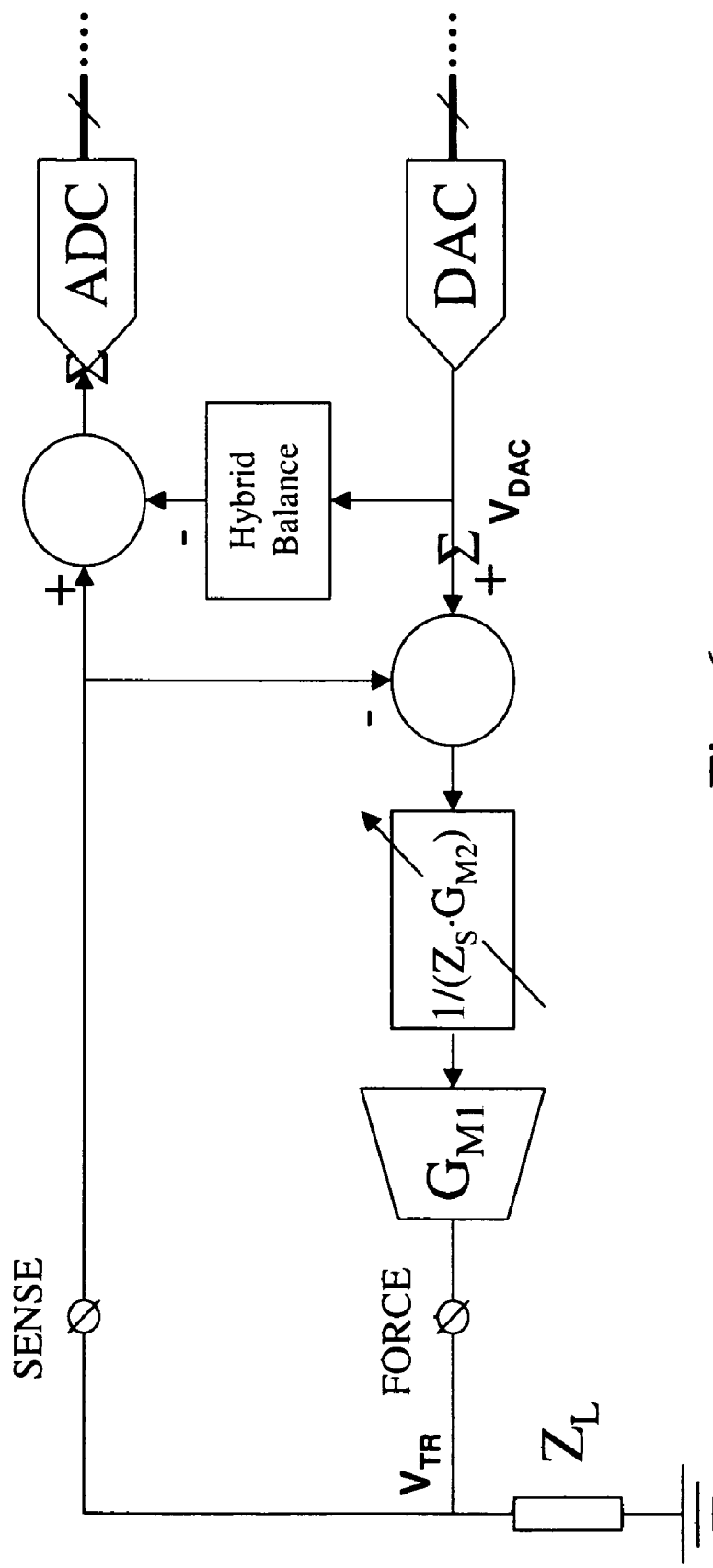
FIG. 6 presents an equivalent simplified single ended diagram for the typical arrangement of the impedance matching circuits of the present invention.

An equivalent simplified single ended diagram is shown in FIG. 6. The operational transconductance amplifier OTA has a gain of Gm1 and the impedance ZL is the same as the characteristic telephone line impedance. In order to achieve the characteristic termination impedance and source impedance, the impedance matching circuit needs to have a transfer function of:

$$H = \frac{1}{Z_S \cdot g_{M2}}$$

The impedance matching circuit in combination with the OTA and the AC sense feedback will then generate an output impedance of $Z_S$ at the output of the OTA when $g_{M1}$ equals $g_{M2}$. This output impedance Zs is then programmed to match the characteristic load impedance ZL. The output level will be:

$$\frac{V_{TR}}{V_{DAC}} = \frac{g_{M1} \cdot Z_L}{g_{M2} \cdot Z_S + g_{M1} \cdot Z_L}$$

$$\frac{V_{TR}}{V_{DAC}}\bigg|^{g_{M1}=g_{M2}} = \frac{Z_L}{Z_S + Z_L}$$

In order to synthesize $$H(s) = \frac{1}{Z_s(s) \cdot g_{M2}},$$

we need to create the 1/x function of the characteristic telephone line impedance and multiply it with a constant gain factor 1/gm2.

The characteristic impedance is defined as:

$$Z_0(s) = R_1 + \frac{R_2}{1 + sR_2 \cdot C}$$

Therefore the 1/x equivalent is:

$$\frac{1}{Z_0(s)} = \frac{1}{R_1 + \frac{R_2}{1+sR_2 \cdot C}}$$

$$= \frac{1}{R_1 + R_2} \cdot \frac{1 + s \cdot R_2 \cdot C}{1 + s\frac{R_1 \cdot R_2}{R_1 + R_2} \cdot C}$$

Therefore H(s) needs to be:

$$H(s) = \frac{1}{g_M} \cdot \frac{1}{R_1 + R_2} \cdot \frac{1 + s \cdot R_2 \cdot C}{1 + s\frac{R_1 \cdot R_2}{R_1 + R_2} \cdot C}$$

Figure 7:
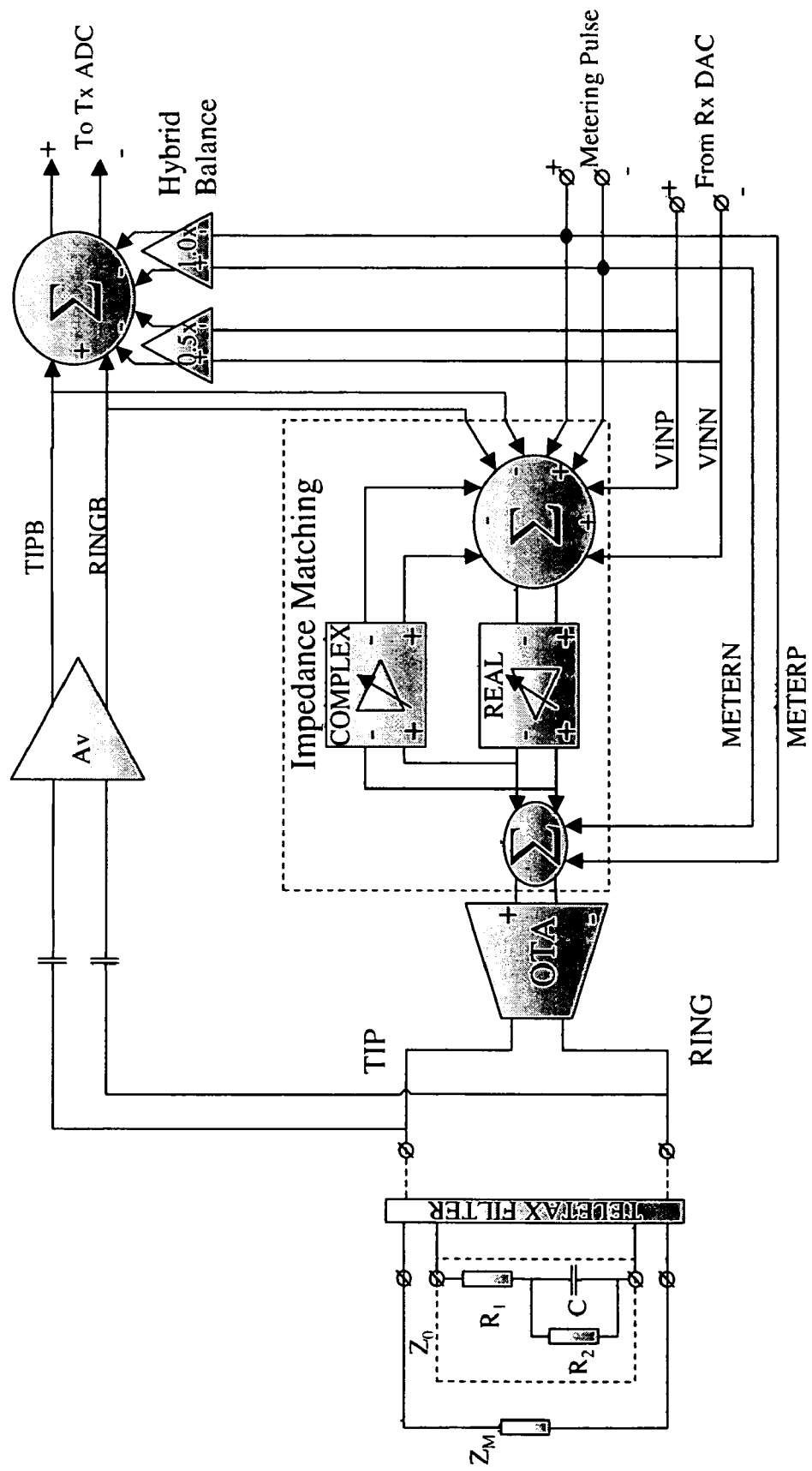
FIG. 7 illustrates the typical arrangement of the programmable integrated impedance matching circuits of the present invention further incorporating a Teletax (metering pulse) feature.

This arrangement of the impedance matching circuit also allows easy integration of a Teletax (metering pulse) feature. The integration of this feature is shown in FIG. 7.

A special TELETAX filter is used to separate the metering pulse signal from the voice signal on the customer provided equipment (CPE) side.

Figure 8:
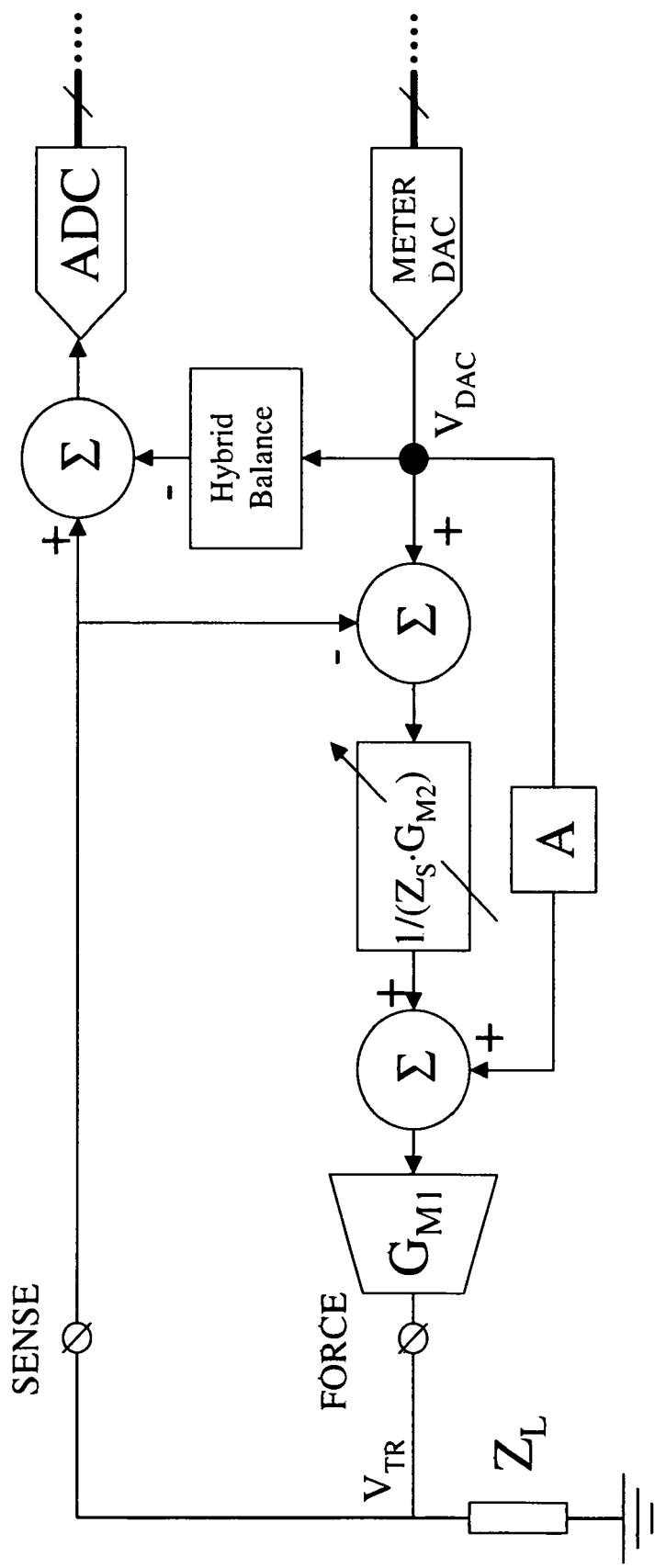
FIG. 8 presents a simplified single ended diagram for the metering pulse section of FIG. 7.

A simplified single ended diagram for the metering pulse section is shown in FIG. 8. The OTA has a gain of Gm1 and the impedance ZL is the same as the metering pulse load impedance ZM. The transfer function is shown below. As can be seen, the gain is 1 and independent of the characteristic telephone line impedance ZS as long as the gain factor A=(1/Gm*ZL), where ZL=ZM.

$$\frac{V_{TR}}{V_{DAC}} = \frac{A \cdot g_{M2} \cdot g_{M1} \cdot Z_L \cdot Z_S + g_{M1} \cdot Z_L}{g_{M2} \cdot Z_S + g_{M1} \cdot Z_L}$$

$$\left.\frac{V_{TR}}{V_{DAC}}\right|^{g_{M1}=g_{M2}} = \frac{A \cdot g_M \cdot Z_L \cdot Z_S + Z_L}{Z_S + Z_L} = 1$$

$$A = \frac{1}{g_M \cdot Z_L}$$

Parasitic components at the telephone line terminals can affect the return loss characteristics. Such parasitics are shown in U.S. Pat. No. 4,789,999. The arrangement of the impedance matching circuit in the present invention can easily be modified in order to add a compensation network for such parasitic components. This modification is shown in FIG. 9.

Figure 1:
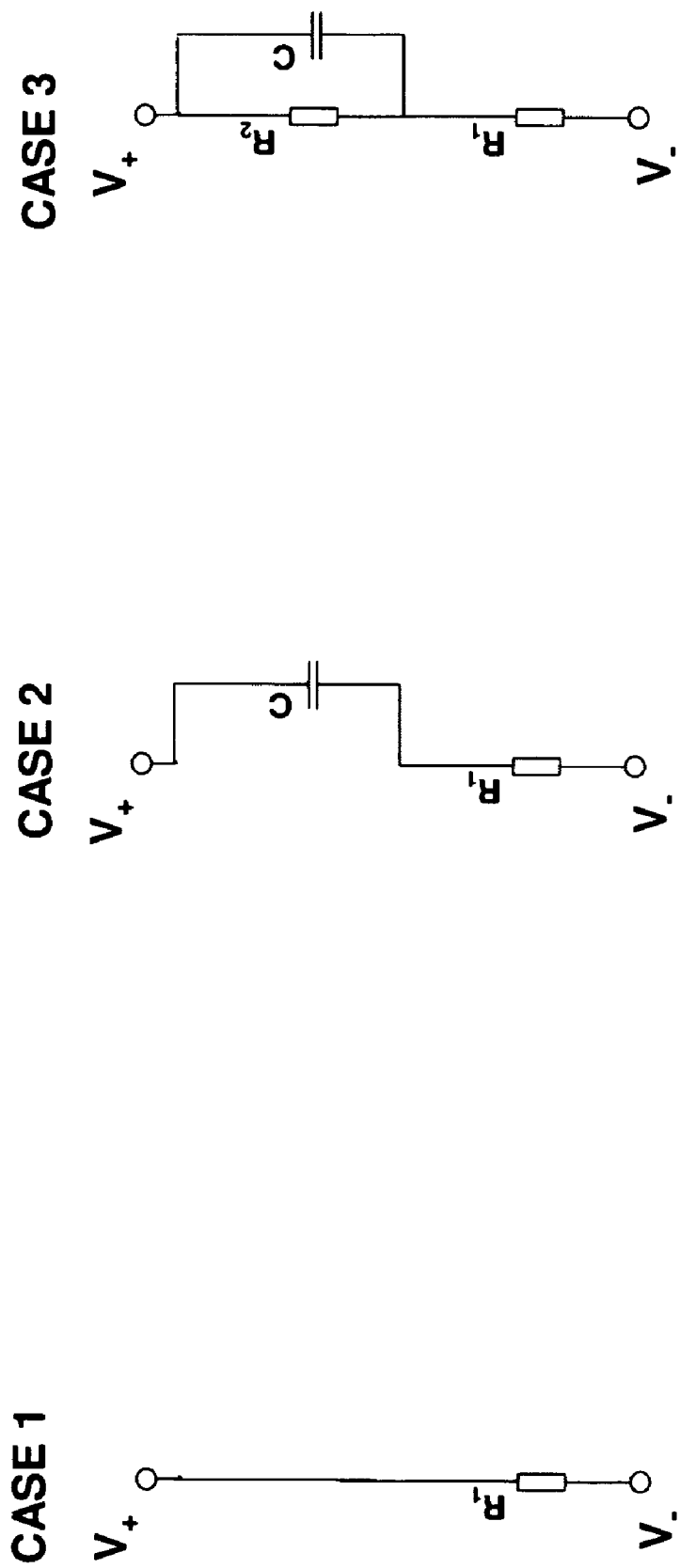
FIG. 1 illustrates the three types of characteristic telephone line impedances found throughout the global telephony administrations.
Figure 2:
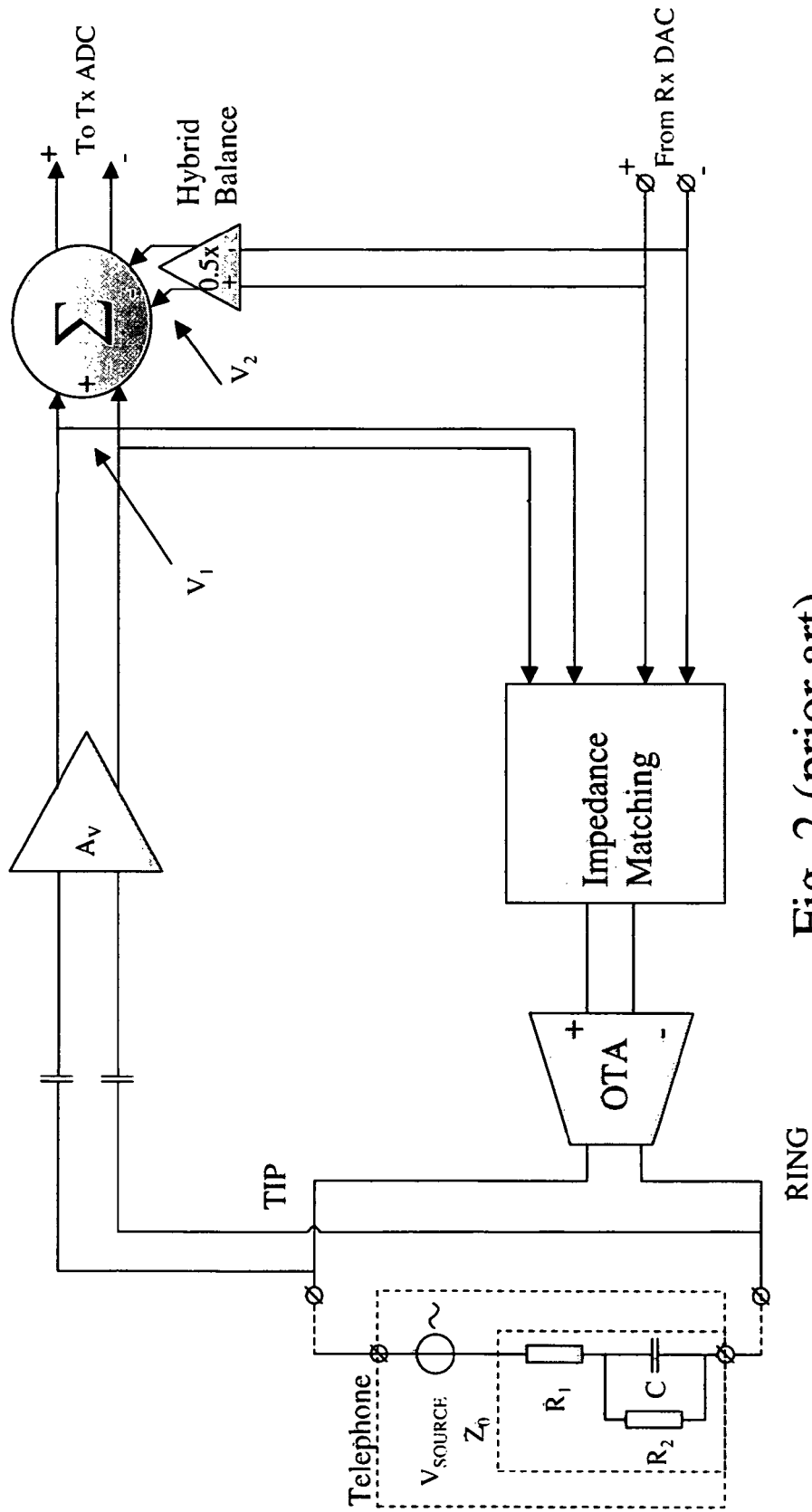
FIG. 2 illustrates the typical arrangement of a prior art solid-state impedance matching circuit.
Figure 3:
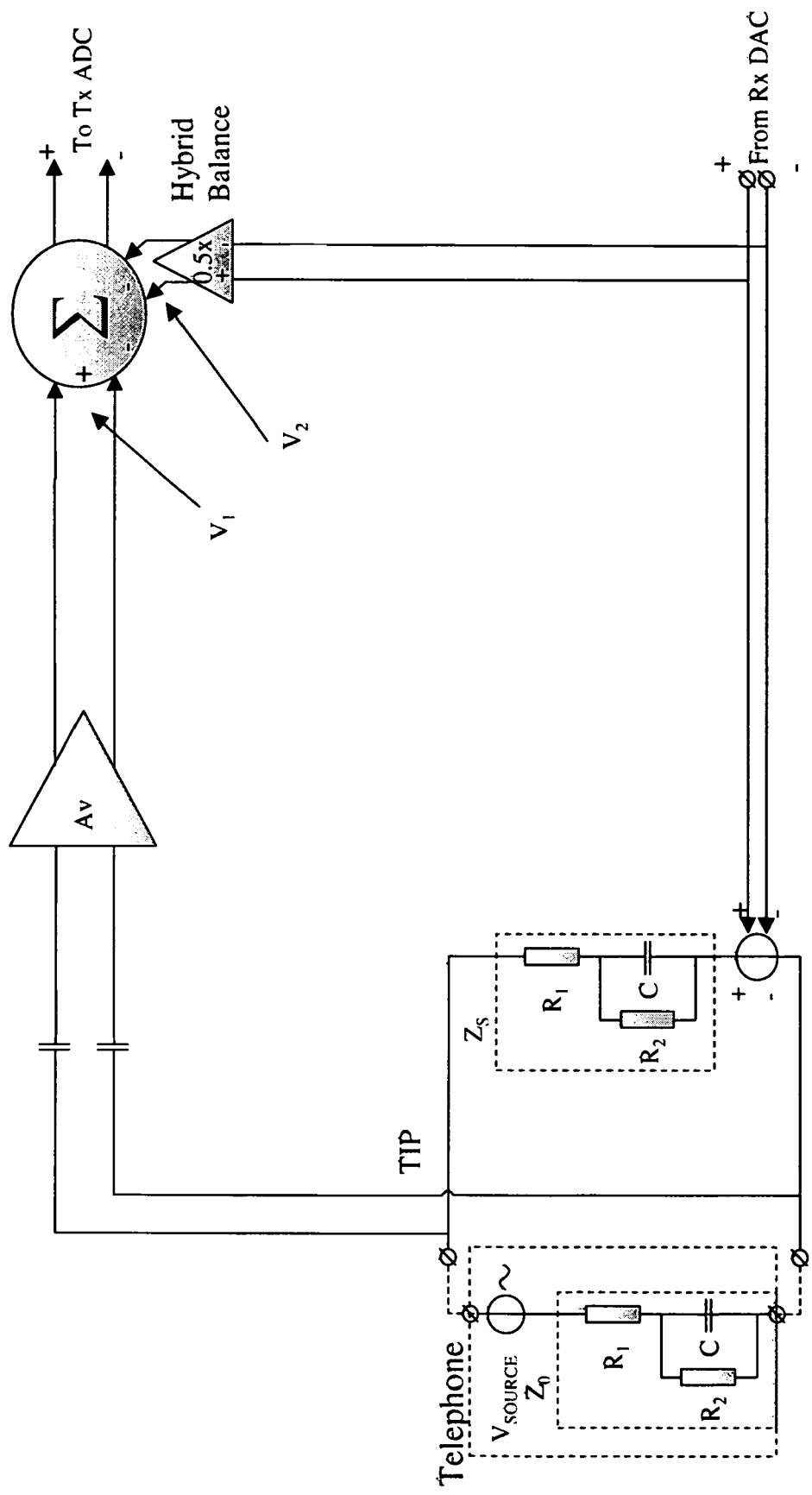
FIG. 3 is equivalent circuit block diagram for the impedance matching circuit of FIG. 2.
Figure 4:
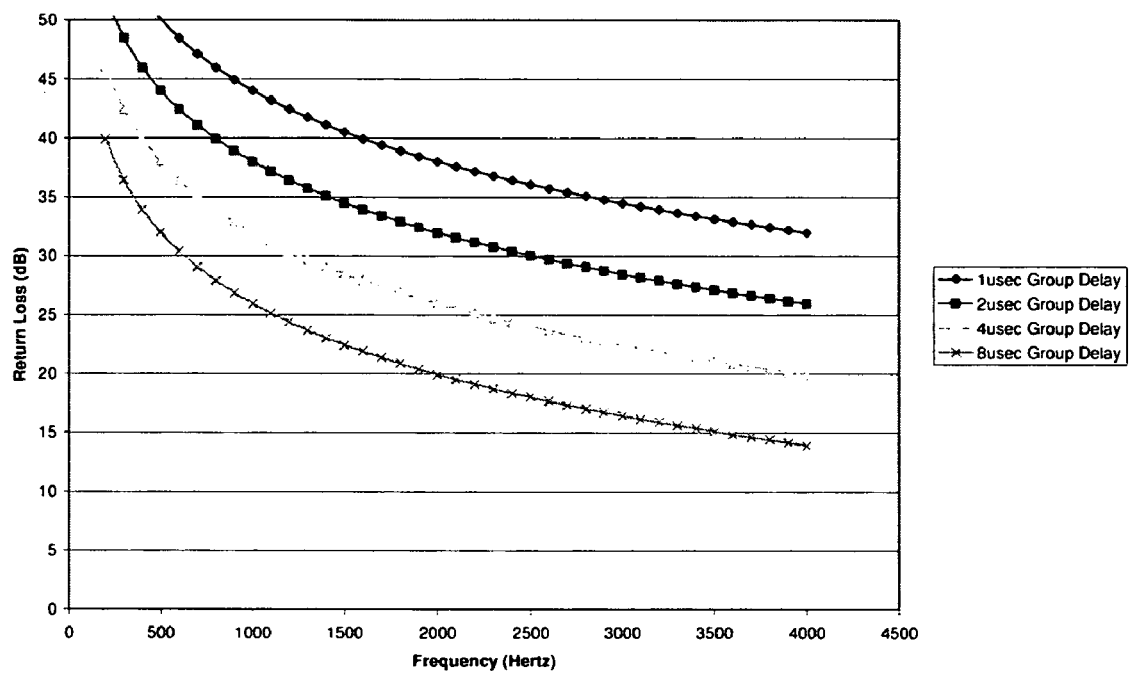
FIG. 4 illustrates the maximum achievable trans hybrid return loss for various delays.
Figure 9:
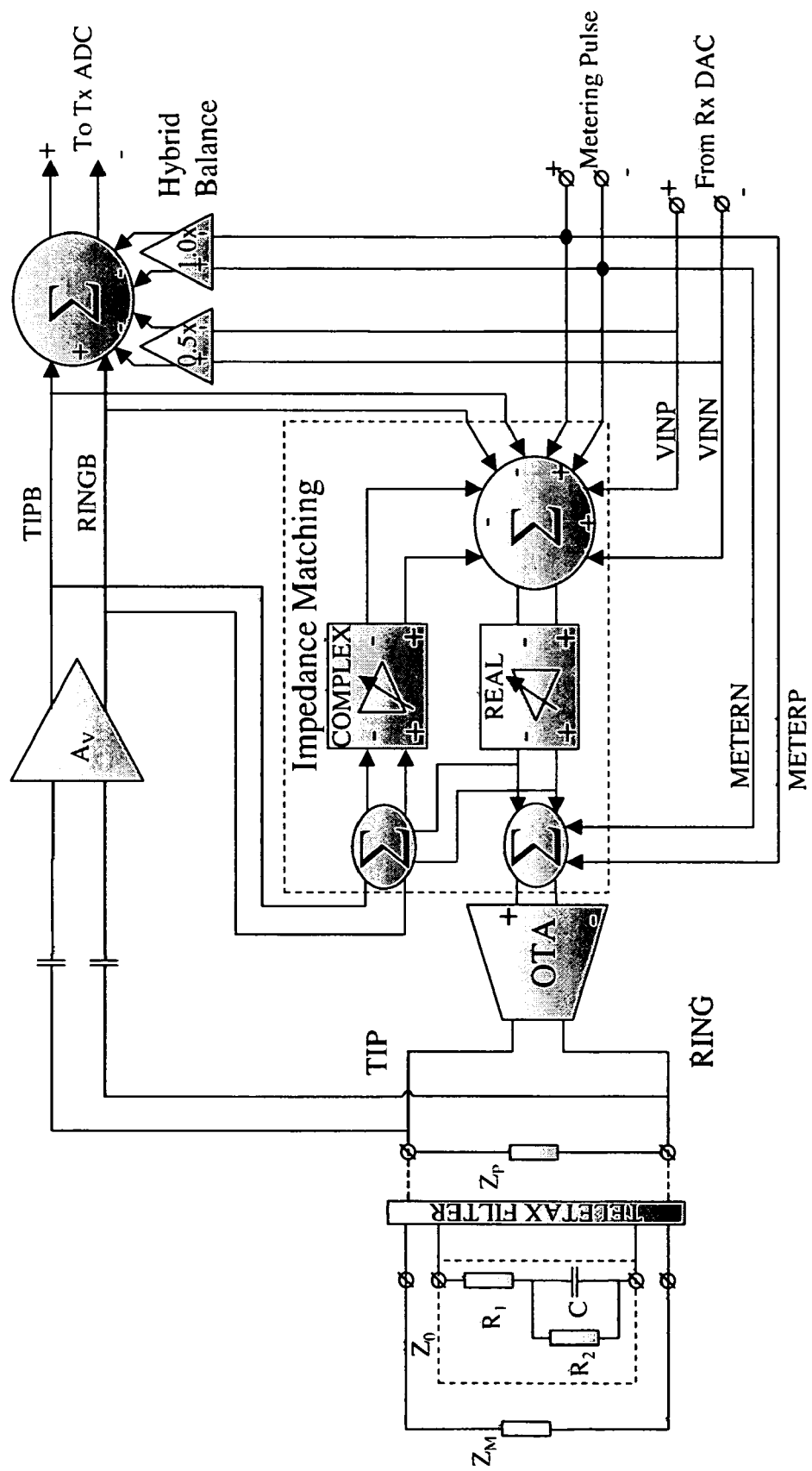
FIG. 9 illustrates the typical arrangement of the impedance matching circuit of the present invention as modified in order to add a compensation network for parasitic components at the telephone line terminals.
Figure 10:
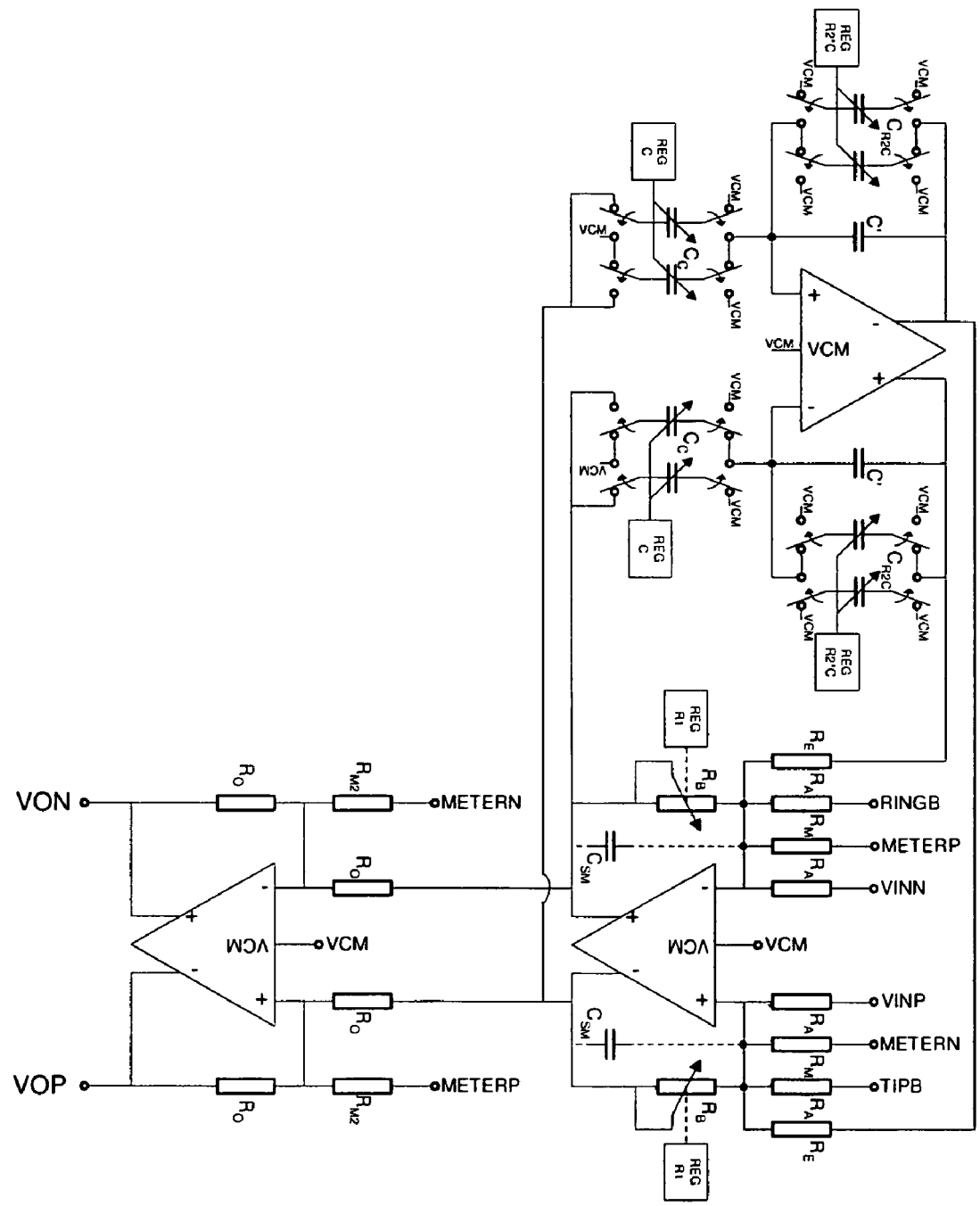
FIG. 10 illustrates an actual implementation of the impedance matching circuit of the embodiment of FIG. 9 of the present invention, including the Teletax feature.

FIG. 10 illustrates an actual implementation of the impedance matching circuit of the embodiment of FIG. 9 of the present invention, including the Teletax feature. The circuit is controlled by three registers that set the impedance of the impedance matching circuit. REG R1 sets resistor RB in order to match resistor R1 (the plain series resistance) of the telephone line impedance (FIG. 1). REG C sets capacitor CC in order to match capacitor C of the telephone line impedance (FIG. 1 again). REG R2*C sets capacitor R2C in order to match the time constant R2 x C of the telephone line impedance (also FIG. 1).

Figure 11:
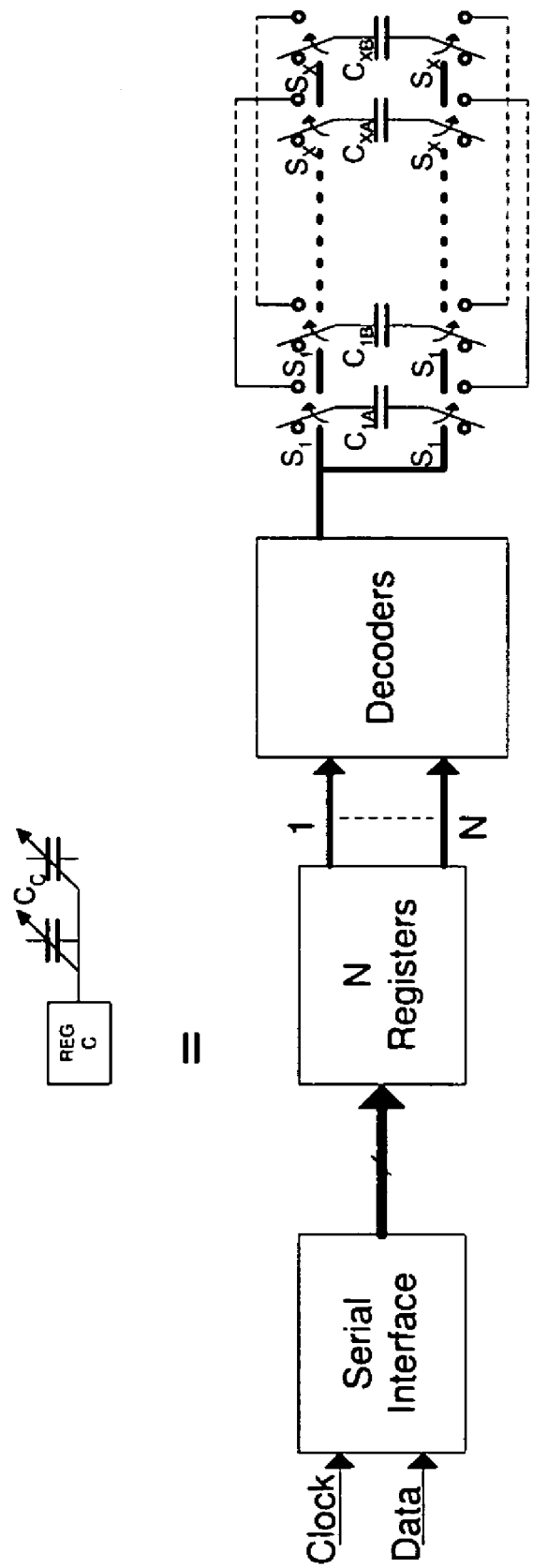
FIG. 11 illustrates how the capacitors are programmed.

FIG. 11 illustrates how the capacitors are programmed. A serial digital interface is used to program N on-chip registers. These registers can be used for multiple purposes. One of the purposes is to use registers for the programmable capacitors. The registers for the programmable capacitors are decoded, such that a multiple of capacitors C1 through Cx can be connected in parallel. Since the system is using a double sampling technique, there are two sets of capacitors to be programmed in parallel. The values and settings for each set are identical. In the preferred embodiment, a serial interface to user provided equipment is provided as part of the present invention impedance matching circuitry, with the user reprogramming the registers on each reset of the circuitry, unless the default programming is used.

Figure 12:
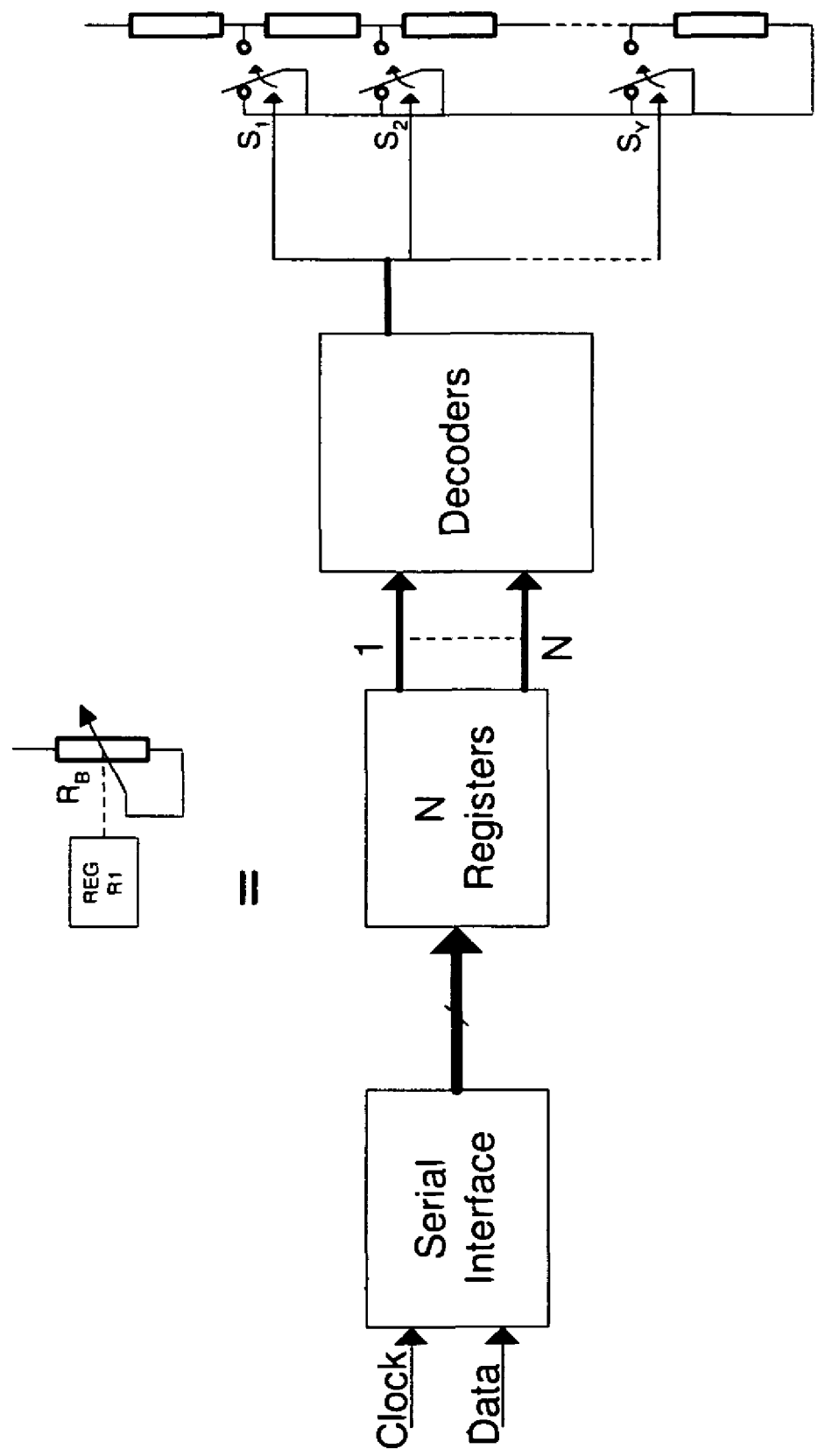
FIG. 12 illustrates how the resistors are programmed.

A similar structure exists for the programmable resistors, as shown in FIG. 12. The registers for the programmable resistors are decoded, such that a multiple of resistors R1 through Ry can be connected in series. The resistors are synthesized using a switched capacitor circuit. The switched capacitor circuit is switched at a fast sampling clock frequency compared to the voice frequencies to be processed. Therefore, the switched capacitor branches can be transformed to continuous time equivalents using:

$$R \approx \frac{T_{SAMPLE}}{C}$$

Figure 13:
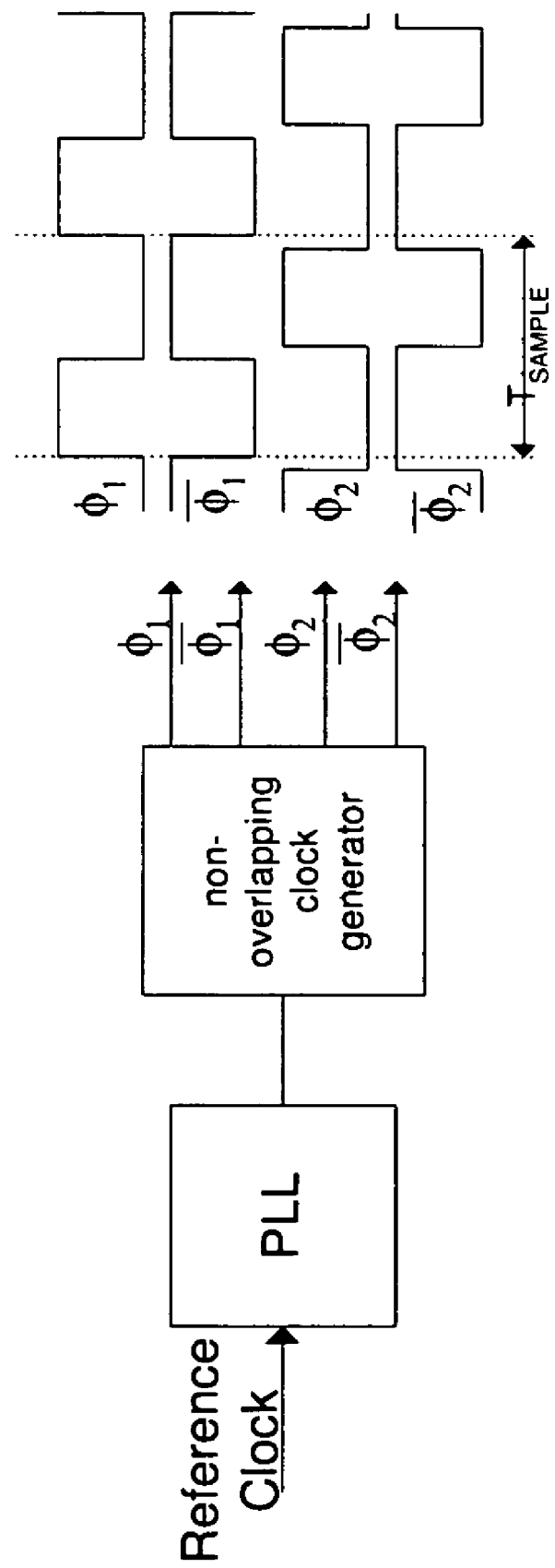
FIG. 13 illustrates the PLL and the internal non-overlapping clock generator as referenced to an external reference.
Figure 14A:
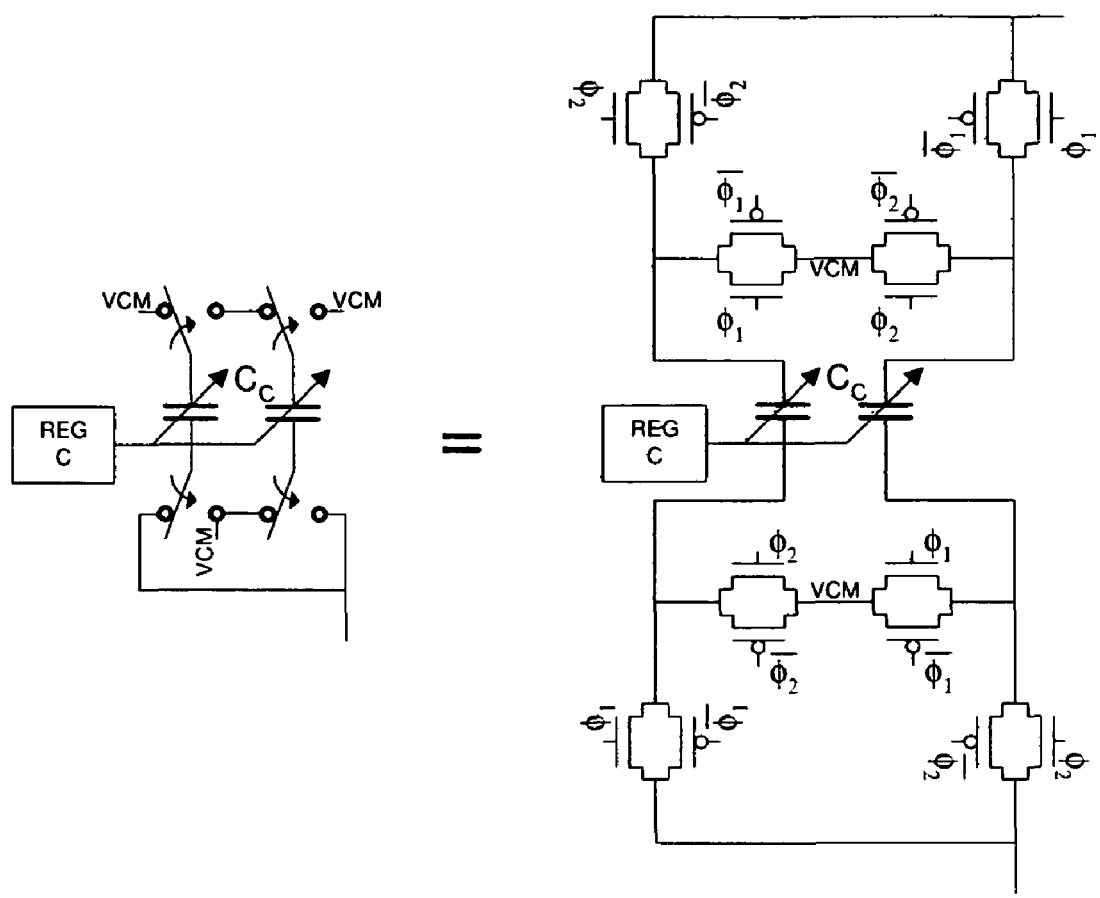
FIGS. 14a and 14b illustrate detailed implementations for the two switched capacitor configurations controlled by register C.
Figure 14B:
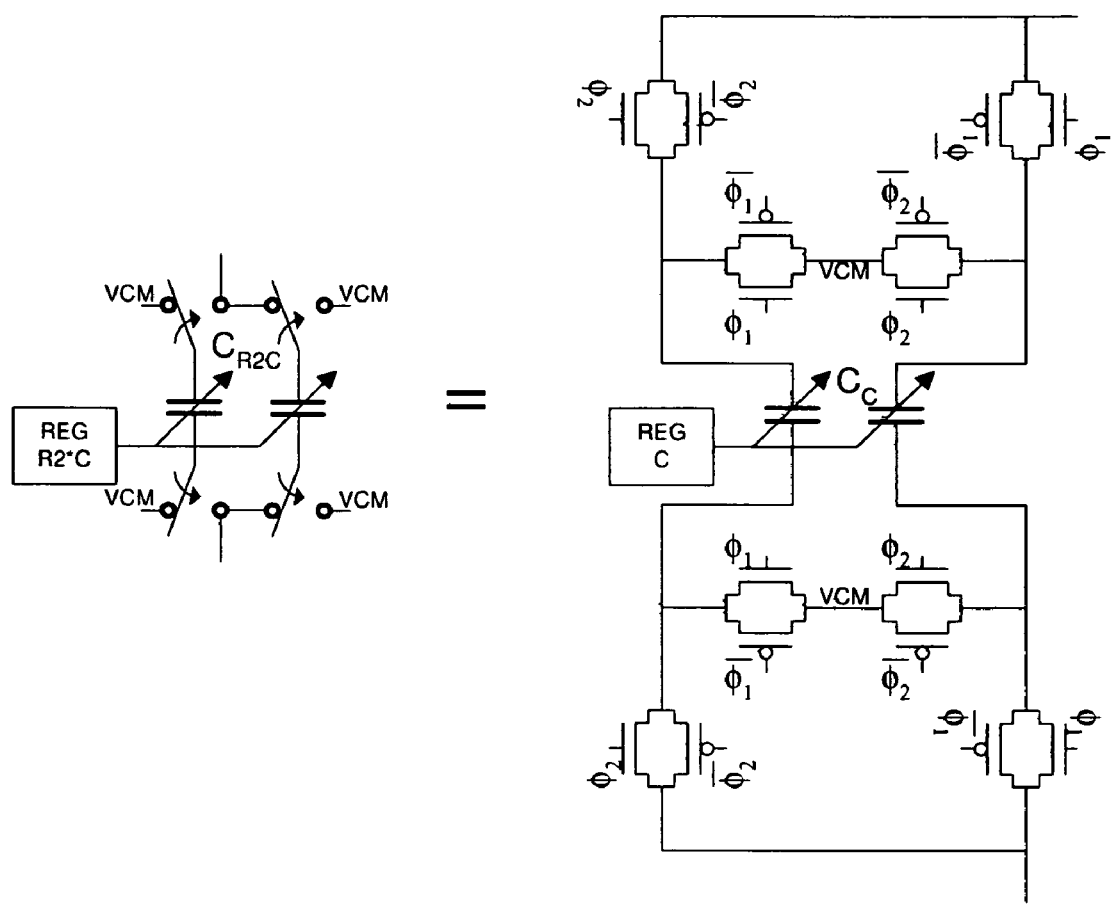

The clock is generated by a non-overlapping clock generator, which is supplied by an on-chip PLL. The PLL synchronizes the internal clock to an external reference clock as shown in FIG. 13. The external reference is provided from user supplied equipment. The non-overlapping clock generator controls the CMOS switches of the switched capacitor stages. The detailed implementations for the two switched capacitor configurations are shown in FIGS. 14a and 14b.

With the approximation $$R \approx \frac{T_{SAMPLE}}{C},$$

the transfer function H(s) then becomes:

$$H(s) = \frac{VOP - VON}{VINP - VINN}$$

$$= \frac{R_B}{R_A} \cdot \frac{C_{R2C} \cdot R_E}{C_{R2C} \cdot R_E + R_B \cdot C_C} \cdot$$

$$\frac{1 + s \cdot \left(\frac{T_{SAMPLE}}{C_{R2C}}\right) \cdot C'}{1 + s \cdot \left(\frac{T_{SAMPLE}}{C_{R2C}}\right) \cdot C' \cdot \left(\frac{C_{R2C} \cdot R_E}{C_{R2C} \cdot R_E + R_B \cdot C_C}\right)}$$

This equation is similar to the earlier described requirement for H(s).

Case 1 (This realizes the plain resistive impedance of case 1 of FIG. 1):

$$R_E \to \infty$$
$$C_C = 0$$
$$\Rightarrow H(s) = \frac{R_B}{R_A} = \frac{1}{G_M \cdot R1}$$

Case 2 (This realizes the resistive impedance with series capacitance of case 2 of FIG. 1):

$$R_E = R_A$$

$$\frac{R_B}{R_A} = \frac{1}{G_M \cdot R1}$$

$$C' = \text{constant}$$

$$C_{R2C} = \frac{C' \cdot T_{SAMPLE}}{R2 \cdot C} \to 0$$

$$C_C = \frac{C' \cdot T_{SAMPLE} \cdot G_M}{C}$$

$$\Rightarrow H(s) = \frac{1}{G_M} \cdot \frac{s \cdot C}{1 + s \cdot C \cdot R1}$$

Case 3 (This realizes all three components R1, R2 & C of case 3 of FIG. 1):

$$R_E = R_A$$

$$\frac{R_B}{R_A} = \frac{1}{G_M \cdot R1}$$

$$C' = \text{constant}$$

$$C_{R2C} = \frac{C' \cdot T_{SAMPLE}}{R2 \cdot C}$$

$$C_C = \frac{C' \cdot T_{SAMPLE} \cdot G_M}{C}$$

$$H(s) = \frac{1}{G_M} \cdot \frac{1}{R1 + R2} \cdot \frac{1 + s \cdot R2 \cdot C}{1 + \frac{s \cdot R1 \cdot R2 \cdot C}{R1 + R2}}$$

Teletax Case:

As shown before, the metering pulse can be passed through independent of the source impedance ZS, as long as A=(1/GmR1), where R1 the resistive load of the teletax meter. This is satisfied using:

$$R_M = R_A$$

$$R_{M2} = G_{M'} \cdot R_L \cdot R_O$$

The circuit of FIG. 10 also shows an optional capacitor Csm. This capacitor has a dual purpose. It provides anti-aliasing filtering for the incoming signal, as well as smoothing filtering for the switched capacitor circuits. Adding this capacitor does increase the delay, but due to it's dual purpose, the delay is minimized.

Figure 15:
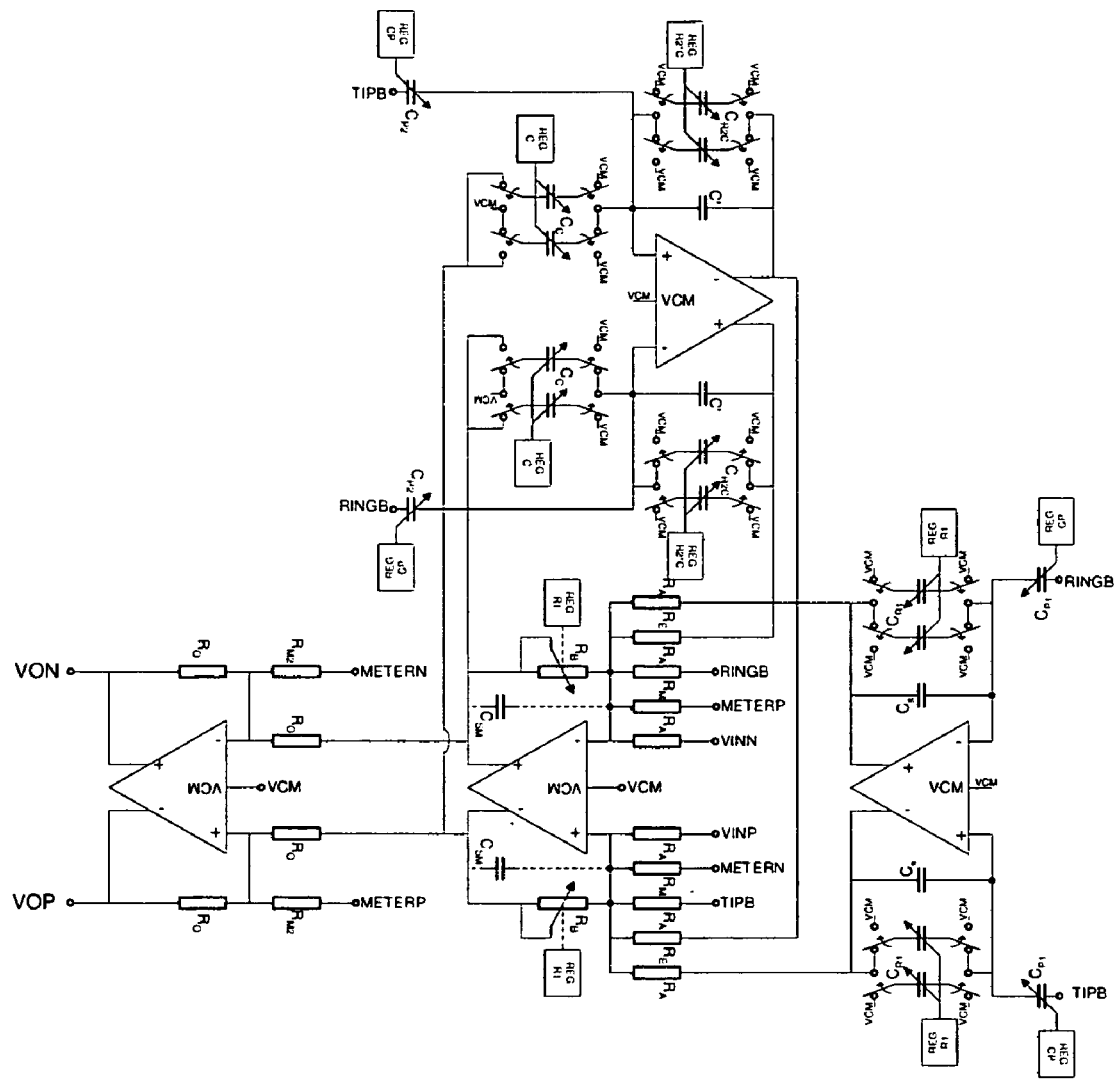
FIG. 15 illustrates the circuit of the present invention as configured to add a compensation network for parasitic components at the telephone line terminals due to wiring and surge protection circuitry.

The telephone line circuit often has parasitic components at the terminals due to wiring and surge protection circuitry. This affects the effective termination impedance and therefore the return loss. The circuit of the present invention can easily be configured to add a compensation network for this. An example is shown in FIG. 15.

Figure 16:
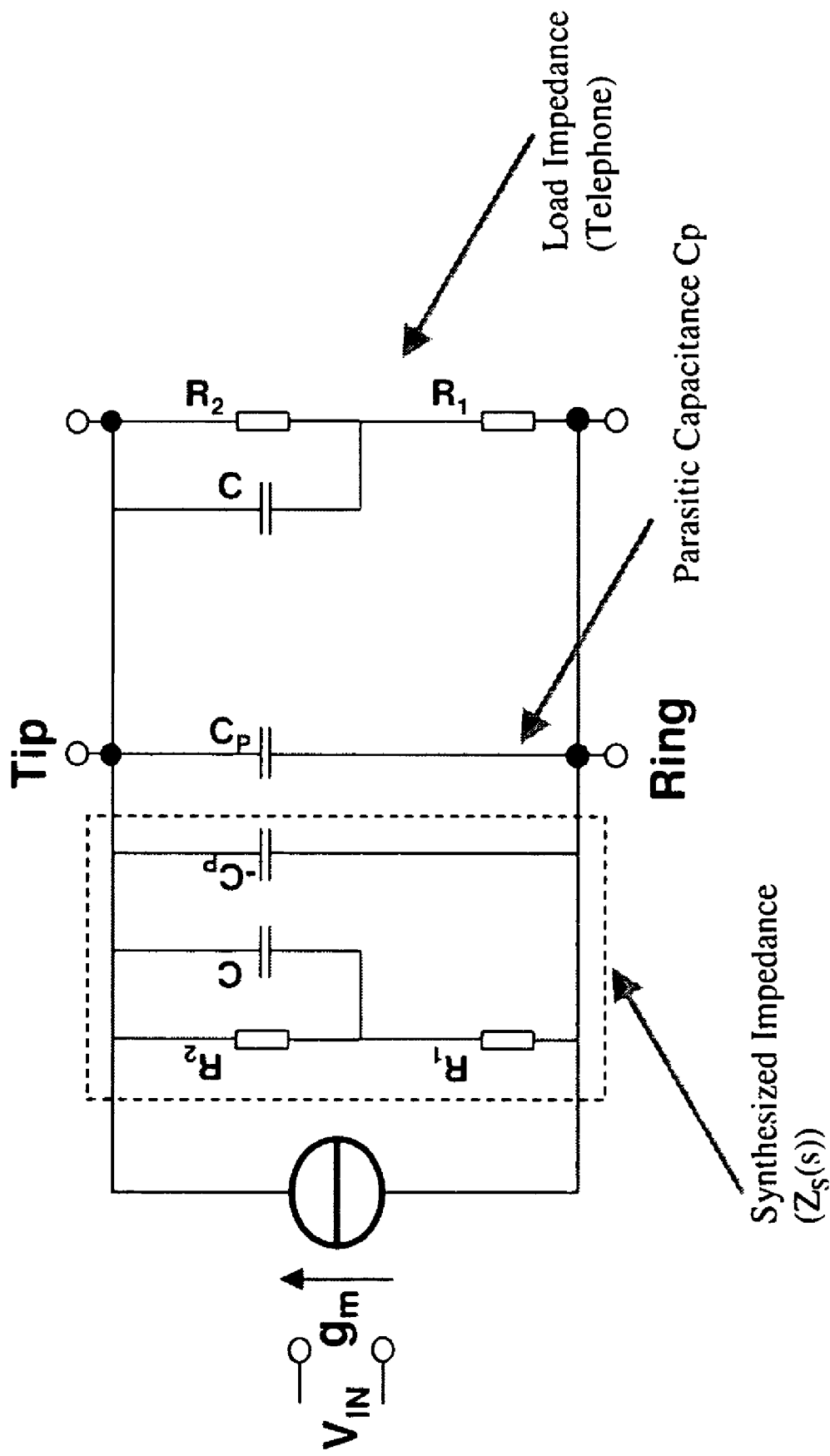
FIG. 16 illustrates how the exemplary circuit of the present invention can compensate for a parallel parasitic capacitance Cp.

FIG. 16 illustrates how the circuit can compensate for a parallel parasitic capacitance Cp. This circuitry effectively creates a negative capacitance in order to subtract it from the parasitic capacitance. Therefore, the equipment on the CPE side will still see the original termination impedance Zs.

The transfer function of the compensation network (from Cp1 & Cp2) is derived:

$$Hp(s) = \frac{V_{OP} - V_{ON}}{V_{TIPB} - V_{RINGB}} = \left(s \cdot \left(\frac{T_{SAMPLE}}{C_{R1}}\right) \cdot C_{P1} + \right.$$

$$\left. \frac{s \cdot \left(\frac{T_{SAMPLE}}{C_{R2C}}\right) \cdot C_{P2}}{1 + s \cdot \left(\frac{T_{SAMPLE}}{C_{R2C}}\right) \cdot C'}\right) \cdot H(s)$$

$$= \left(s \cdot R1 \cdot C_P + \frac{s \cdot R2 \cdot C_P}{1 + s \cdot R2 \cdot C}\right) \cdot H(s)$$

Therefore, the new transfer function with parasitic capacitance compensation becomes:

$$H'(s) = \left(1 - s \cdot R_1 \cdot C_P - \frac{s \cdot R_2 \cdot C_P}{1 + s \cdot R_2 \cdot C}\right) \cdot H(s)$$

Registers are provided to add compensation for various parasitic capacitances. The additional capacitor Cs is just added for smoothing purposes and does not affect the in-band signals.

The invention is not only useful for interfacing telephones to telephone lines, but for interfacing other equipment to telephone lines also, such as FAXes and modems. The invention is also useful in packet switched telephony applications, which use a 'plain old telephone' interface. Currently, one such an application is residential VOIP. In that application the invention would be used in a device called an ATA (analog terminal adapter). An ATA has an interface to the 'plain old telephone' and an Ethernet port to be hooked up to the Internet router. The use of this invention in the ATA for residential VOIP will result in a lower amplitude of the echo and therefore better overall signal quality for the end user. This is essential to residential VOIP OEM's, who are competing heavily with the traditional telephony service providers and trying to offer better quality at a lower price.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A programmable telephone line impedance matching circuit for coupling to a telephone line through an operational transconductance amplifier, the matching circuit having AC feedback from the telephone line, comprising an integrated circuit having:

analog circuitry coupled between a matching circuit input and a matching circuit output, the analog circuitry providing time continuous amplification between the matching circuit input and the matching circuit output;

the time continuous amplification having a programmable feedback resistance programmable to cause an output impedance at the operational transconductance amplifier output to match a plain series resistance of any of a plurality of characteristic telephone line impedances;

a feedback amplifier having a capacitance in its feedback circuit, an output of the analog circuitry being coupled through a first switched capacitor circuit to an input of the feedback amplifier, a second switched capacitor circuit being coupled in parallel with the capacitance in the feedback circuit, an output of the feedback amplifier being coupleable to an input of the analog circuitry, the switched capacitor circuits synthesizing resistances; and feedback capacitance coupled in parallel with the programmable feedback resistance to provide anti-aliasing filtering for an input signal and smoothing filtering from the switched capacitor circuits.

2. The matching circuit of claim 1 wherein the switched capacitor circuits are double sampling switched capacitor circuits.

3. The matching circuit of claim 2 wherein the capacitance in the switched capacitor circuits is programmable.

4. The matching circuit of claim 1 wherein a characteristic telephone line impedance of a simple resistance is matched by the output impedance at the transconductance amplifier output by selection of an appropriate programmable feedback resistance and decoupling the output of the feedback amplifier from the input of the analog circuitry.

5. The matching circuit of claim 1 wherein a characteristic telephone line impedance of a simple resistance in series with a simple capacitance is matched by the output impedance at the transconductance amplifier output by selection of an appropriate programmable feedback resistance, causing the first switched capacitor circuit to simulate a corresponding resistance, causing the second switched capacitor circuit to simulate an infinite resistance and coupling the output of the feedback amplifier to the input of the analog circuitry.

6. The matching circuit of claim 1 wherein a characteristic telephone line impedance of a simple resistance in series with a parallel combination of a resistance and a capacitance is matched by the output impedance at the transconductance amplifier output by selection of an appropriate programmable feedback resistance, causing the first switched capacitor circuit to simulate a corresponding resistance, causing the second switched capacitor circuit to simulate an appropriate resistance and coupling the output of the feedback amplifier to the input of the analog circuitry.

7. The matching circuit of claim 1 wherein the analog circuitry further comprises circuitry for receiving a metering pulse and providing the matching circuit output matching a characteristic telephone line impedance at a predetermined frequency.

8. The matching circuitry of claim 1 further comprising a network to compensate for parasitic components at the telephone line terminals due to wiring and surge protection circuitry.

9. The matching circuitry of claim 1 further comprised of circuitry for compensating for a parallel parasitic capacitance on the telephone line.

10. A programmable telephone line impedance matching circuit for coupling to a telephone line through a transconductance amplifier, the matching circuit having AC feedback from the telephone line, comprising an integrated circuit having:

analog circuitry coupled between a differential matching circuit input and a differential matching circuit output, the analog circuitry providing time continuous amplification between the differential matching circuit input and the differential matching circuit output;

the time continuous amplification having feedback resistances programmable to cause an output impedance at the transconductance amplifier output to match a plain series resistance of any of a plurality of characteristic telephone line impedances;

a feedback amplifier having capacitances in its feedback circuit, a differential output of the analog circuitry being coupled through first switched capacitor circuits to a differential input of the feedback amplifier, second switched capacitor circuits being coupled in parallel with the capacitances in the feedback circuit, a differential output of the feedback amplifier being coupleable to a differential input of the analog circuitry, the switched capacitor circuits synthesizing resistances; and feedback capacitors coupled in parallel with the programmable feedback resistances to provide anti-aliasing filtering for an input signal and smoothing filtering for the switched capacitor circuits.

11. The matching circuit of claim 10 wherein the switched capacitor circuits are double sampling switched capacitor circuits.

12. The matching circuit of claim 11 wherein the capacitance in the switched capacitor circuits is programmable.

13. The matching circuit of claim 10 wherein a characteristic telephone line impedance of a simple resistance is matched by the output impedance at the transconductance amplifier output by selection of an appropriate programmable feedback resistances and decoupling the differential output of the feedback amplifier from the differential input of the analog circuitry.

14. The matching circuit of claim 10 wherein a characteristic telephone line impedance of a simple resistance in series with a simple capacitance is matched by the output impedance at the transconductance amplifier output by selection of appropriate programmable feedback resistances, causing the first switched capacitor circuits to simulate corresponding resistances, causing the second switched capacitor circuits to simulate an infinite resistance and coupling the differential output of the feedback amplifier to the differential input of the analog circuitry.

15. The matching circuit of claim 10 wherein a characteristic telephone line impedance of a simple resistance in series with a parallel combination of a resistance and a capacitance is matched by the output impedance at the transconductance amplifier output by selection of appropriate programmable feedback resistances, causing the first switched capacitor circuits to simulate corresponding resistances, causing the second switched capacitor circuits to simulate appropriate resistances and coupling the differential output of the feedback amplifier to the differential input of the analog circuitry.

16. The matching circuit of claim 10 wherein the analog circuitry further comprises circuitry for receiving a metering pulse and providing the differential output of the matching circuit having a characteristic telephone line impedance at a predetermined frequency.

17. The matching circuitry of claim 10 further comprising a network to compensate for parasitic components at the telephone line terminals due to wiring and surge protection circuitry.

18. The matching circuitry of claim 10 further comprised of circuitry for compensating for a parallel parasitic capacitance on the telephone line.

* * * * *